United States Patent

Godden

[11] 4,210,216
[45] Jul. 1, 1980

[54] HEATED PLATFORM SCALE

[75] Inventor: Glenn S. Godden, Lynnwood, Wash.

[73] Assignee: Eldec Corporation, Lynnwood, Wash.

[21] Appl. No.: 3,865

[22] Filed: Jan. 16, 1979

[51] Int. Cl.² .................. G01G 19/02; G01G 3/14; G01G 23/00
[52] U.S. Cl. ........................... 177/134; 177/211; 177/245
[58] Field of Search ............... 177/134, 135, 211, 226, 177/245

[56] References Cited

U.S. PATENT DOCUMENTS

| 2,482,047 | 9/1949 | Williams | 177/134 |
| 3,082,834 | 3/1963 | Ellis | 177/134 |
| 3,266,584 | 8/1966 | Lee | 177/134 |
| 3,661,220 | 5/1972 | Harris | 177/211 X |
| 4,020,911 | 5/1977 | English et al. | 177/211 X |
| 4,094,370 | 6/1978 | Ruiter | 177/226 X |
| 4,095,659 | 6/1978 | Blench et al. | 177/211 X |

*Primary Examiner*—George H. Miller, Jr.
*Attorney, Agent, or Firm*—Christensen, O'Connor, Johnson & Kindness

[57] ABSTRACT

A heated platform scale for vehicles. A pair of electrical resistance heaters is installed in an enclosure for a load cell of a vehicle platform scale. A thermostat controls the heaters so as to maintain the enclosure, and therefore, the load cell within a range of temperatures above freezing. Accumulation of snow and ice around the load cell is thereby prevented, and inaccuracies due to temperature variations are eliminated.

12 Claims, 5 Drawing Figures

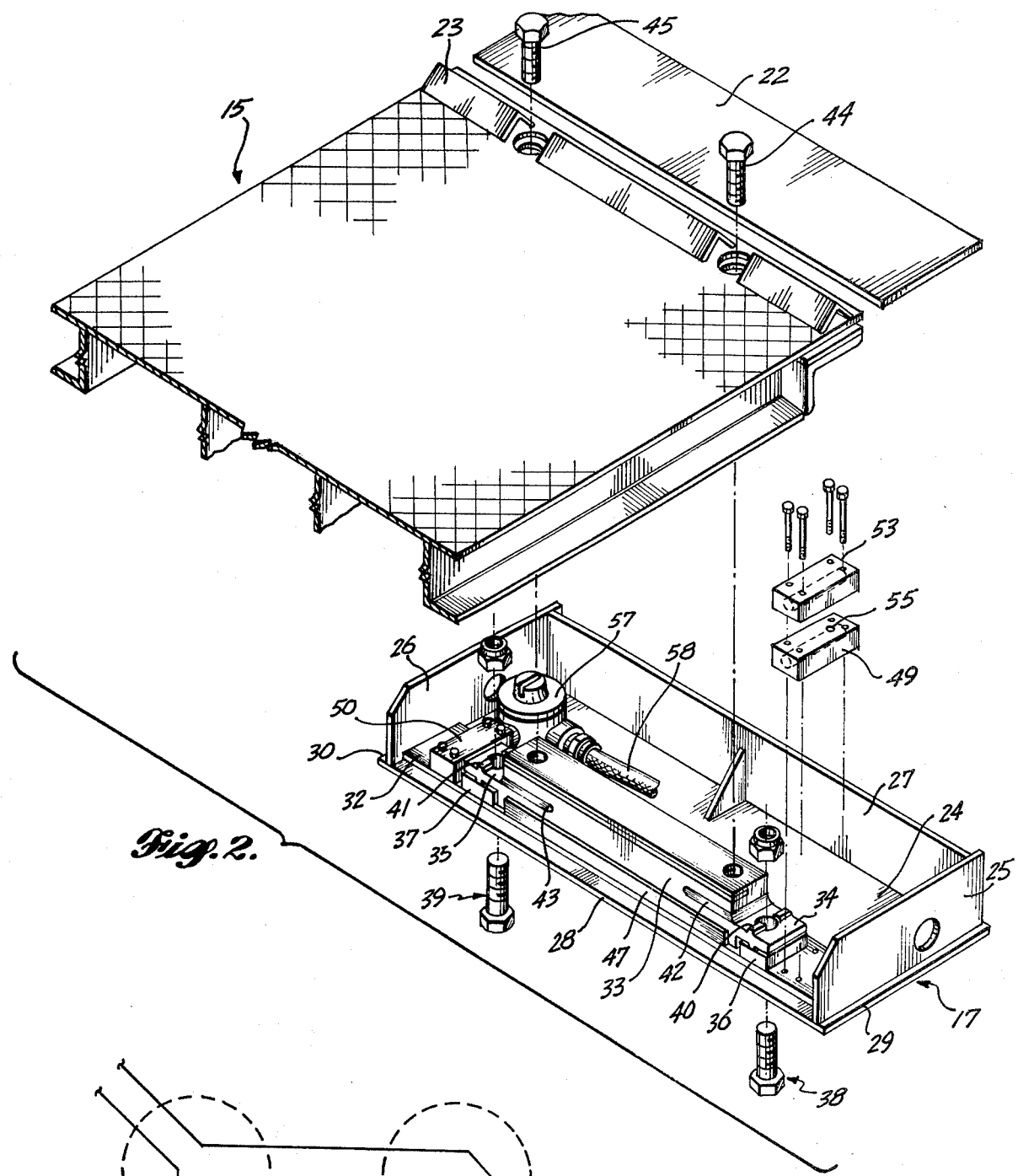
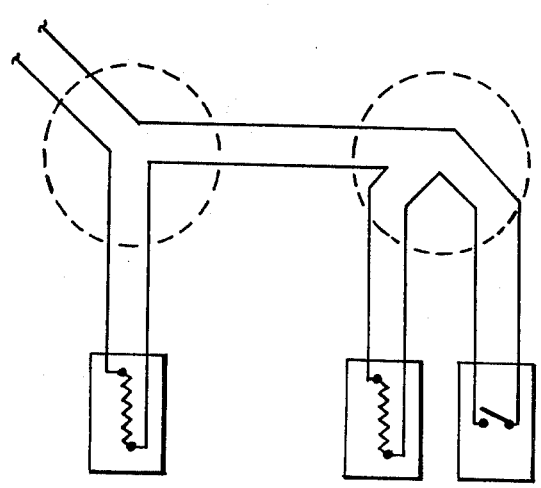

HEATED PLATFORM SCALE

BACKGROUND OF THE INVENTION

This invention relates generally to platform scales, and, more particularly, to heated vehicle platform scales.

Modern platform scales for trucks or other vehicles frequently employ strain gauge technology, whereby weight is measured by means of strain gauge transducers, or load cells. The platform is supported by load cells spaced from one another, each of which is typically mounted within an enclosure and supported therein so that the load cell is capable of deflection as weight is applied to the platform. Strain gauges mounted on the load cell sense load cell deflection and provide electrical signals related thereto. The electrical signals are combined, amplified if necessary, and supplied to an indicator which provides a display of the weight borne by the platform.

Such scales are preferred over other types of scales because the read-out is nearly instantaneous and requires no manual operations. These scales are typically installed at truck stops or service stations where it is desired that a high throughput rate of vehicle weighing by possible with a minimum amount of service help.

A vehicle platform scale is typically installed with the load cell enclosures recessed into an approach surface such that the platform is flush with the surface. A scale pit is sometimes employed under the scale. A pair of scales is generally used, the scales being aligned parallel to one another and spaced apart by such a distance as to accommodate the right and left sets of wheels of a standard truck or other vehicle. In practice, the vehicle is rolled onto the scales and the weight borne by each axle is measured as its wheels pass over the scales.

In cold climates, it has been found that ice and snow sometimes accumulate inside the load cell enclosures and impair the operation of the scale. This accumulation may occur by the action of wind blowing snow into the enclosures or by the action of water running into the enclosures and subsequently freezing. In either event, the ice or snow builds up under the load cells, thereby limiting or otherwise affecting their downward deflection and causing the scale to function improperly.

The build-up of ice or snow occurs where it is hidden from view. Thus, the build-up often goes unnoticed for relatively long periods of time, during which weight measurements may be rendered inaccurate by the build-up, and is often detected only after the weight readings become so grossly erroneous as to alert the scale operator to the malfunction.

In practice, it has been found difficult to avoid this problem. The scales must necessarily be independently supported and detached from the roadway, making it almost impossible to prevent water from seeping into the scale pit or into the load cell enclosures and freezing therein.

Prevention of ice or snow accumulation requires frequent inspection and maintenance, resulting in undesirable down-time and a lower throughput rate. Furthermore, once ice has accumulated it is difficult to remove and results in significantly greater delays in operation.

Further, it has also been found that wide temperature fluctuations are in and of themselves causes of inaccuracies in the function of the platform scales. Wide temperature fluctuations cause expansion and contraction of the load cells and other parts of the platform scale, thereby requiring frequent calibration of the scales.

In view of the foregoing, it is, accordingly, an object and purpose of this invention to provide a device which prevents accumulation of ice and snow in a load cell enclosure of a vehicle platform scale.

It is also an object of this invention to provide a device which maintains the load cell of a platform scale at a relatively constant temperature.

It is a further object of this invention to provide a vehicle platform scale which requires a minimum amount of periodic maintenance and inspection.

SUMMARY OF THE INVENTION

In accordance with the teachings of the present invention, a heater is installed adjacent to the load cells of a platform scale. In a preferred embodiment, a pair of electrical heaters is installed adjacent to each load cell, one heater being at each end of the load cell. The heaters are attached to a support plate which underlies the load cell and is spaced from it. A thermally conductive compound, such as silicone grease, is used between each heater and a support plate surface to improve theremal conductivity.

A thermostat is connected in electrical series with each pair of heaters. The thermostat turns the heaters on and off and maintains the support plate and immediately adjacent parts of the scale within a range of temperatures above the freezing point of water. The load cell, being spaced from the support plate and being of a slightly less thermally conductive material, does not fluctuate in temperature as much as the heaters or support plates. The load cell is thus maintained at a relatively constant temperature within the range of temperatures through which the heater is cycled. Thus, ice and snow are kept from accumulating underneath the load cell and the load cell is also maintained at a relatively constant temperature. The heaters require no supervision or maintenance, and are only activated during cold weather.

BRIEF DESCRIPTION OF THE DRAWINGS

FIG. 2 is an exploded perspective view of a preferred embodiment showing one end of a platform and its associated load cell enclosure;

FIG. 5 is a schematic diagram of the heater and thermostat elements of the preferred embodiment.

DESCRIPTION OF THE PREFERRED EMBODIMENT

Figure 1:
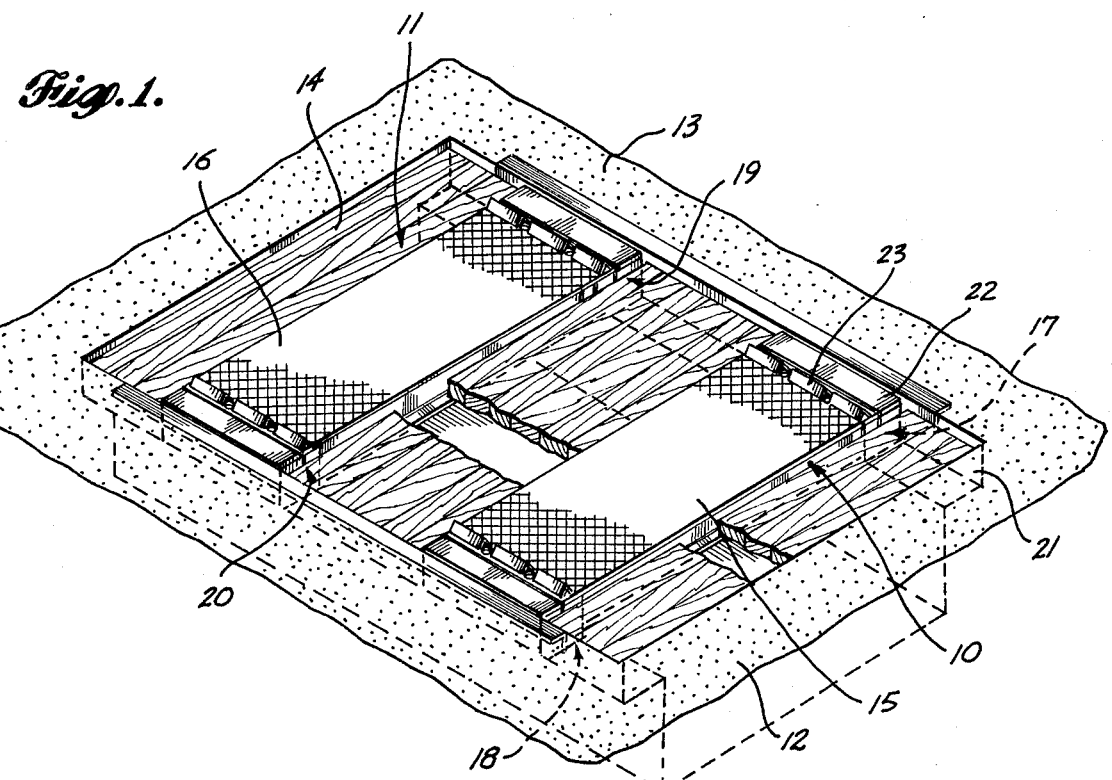
FIG. 1 is a perspective view of a pair of platform scales installed over a scale pit.

With reference to FIG. 1 in particular, a pair of preferred embodiments of the present invention are illustrated as they might be typically installed. Platform scales 10 and 11 are installed parallel to each other over a scale pit 12 and spaced apart by such a distance as to readily accommodate right and left sets of wheels of standard sized vehicles. Vehicles are rolled onto and off of the platform scales 10 and 11 from an approach apron 13 which extends in both directions from the platform scales 10 and 11. The approach apron 13 may be a roadway or any other substantially horizontal, flat surface. In the illustrated embodiment, a set of wooden planks 14 is placed in the gaps over the scale pit 12 as a safety precaution.

Platform scales 10 and 11 consist generally of platforms 15 and 16, respectively, each platform 15 and 16 having a load cell enclosure 17, 18, 19 and 20 at each end thereof. Throughout the following discussion, platform 15 and load cell enclosure 17 of platform scale 10 will be more particularly described, but it will be understood that platform scales 10 and 11 are identical and that the following descriptions are equally applicable to each platform 15 and 16 and load cell enclosure 17, 18, 19 and 20.

Load cell enclosure 17 is mounted in a recess 21 at the edge of scale pit 12. A partial top plate 22 of load cell enclosure 17 is flush with approach apron 13 and the upper surface of platform 15. Wheel stops 23 are secured to each end of platform 15 to ensure correct positioning of vehicle wheels during weighing. Platform 15 is made of a length sufficient to permit weighing of all the wheels on either side of a dual axle assembly, and may be made long enough to provide for triple axle vehicles as well. In practice, a vehicle is rolled onto the platform scales 10 and 11 and the combined weight of one set of wheels at a time is measured.

Figure 3:
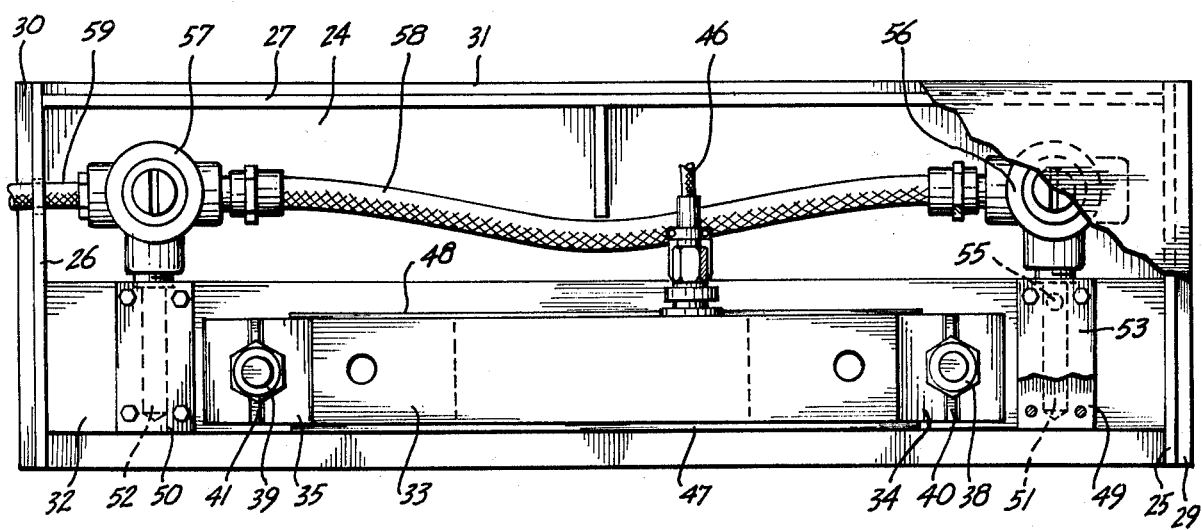
FIG. 3 is a plan view of the embodiment of FIG. 2 showing the load cell and heaters installed in a load cell enclosure.
Figure 4:
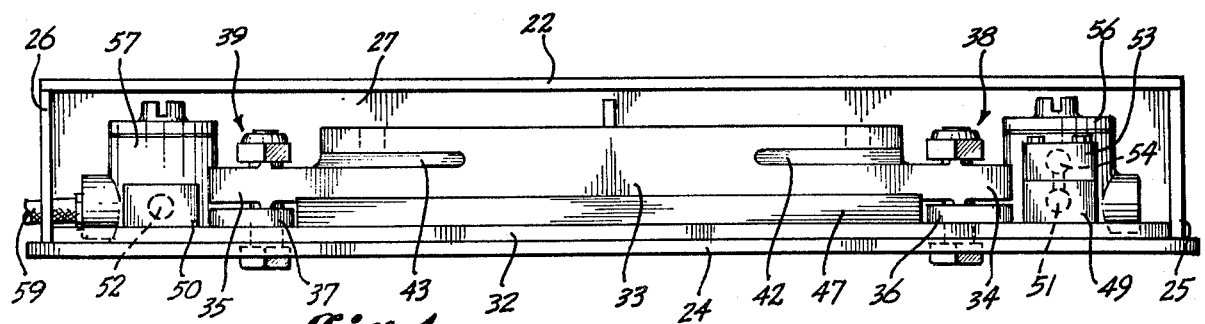
FIG. 4 is a side view of the load cell and heaters installed in a load cell enclosure.

Referring to FIGS. 2, 3 and 4, load cell enclosure 17 consists of a floor plate 24, side walls 25 and 26, rear wall 27 and partial top plate 22. Floor plate 24 has a forward edge 28 adjacent to scale pit 12. The side walls 25 and 26 and rear wall 27 extend vertically upward from side edges 29 and 30, respectively, and rear edge 31 of floor plate 24. Side walls 25 and 26 are rear wall 27 terminate in substantially horizontal upper edges to which partial top plate 22 is attached. When the load cell enclosure 17 is assembled and installed as in FIG. 1, partial top plate 22 is thus parallel to and flush with the surface of approach apron 13.

Referring again to FIGS. 2, 3 and 4, load cell enclosure 17 includes a rectangular support plate 32 which is fixedly secured to floor plate 24 and is parallel to the forward edge 28 thereof.

Above the support plate 32 is positioned a load cell 33. In the preferred embodiment the load cell 33 consists of a rectangular steel block having support tabs 34 and 35 extending from opposite ends thereof. Support tabs 34 and 35 rest upon bearing plates 36 and 37, respectively, which in turn rest upon the support plate 32. Nut and bolt assemblies 38 and 39 secure together the floor plate 24, support plate 32, bearing plates 36 and 37 and support tabs 34 and 35, respectively.

Each support tab 34 and 35 includes a pair of risers 40 and 41, respectively. Risers 40 and 41 each consist of a pair of raised rectangular surfaces extending transversely across the upper and lower surfaces of support tabs 34 and 35. The dimensions of the risers are preferably approximately 0.040 inches thick and approximately one-half inch wide. The pairs of risers 40 and 41 are centered upon the holes through which nut and bolt assemblies 38 and 39 pass.

The purpose of the pairs of risers 40 and 41 is to allow the load cell 33 to deflect in a U-shaped configuration even though the load cell 33 is secured at each end to the bearing plates 36 and 37 by the nut and bolt assemblies 38 and 39. It is well known in the art that, under normal circumstances, a beam secured at each end deflects downward in an S-shaped configuration when a downward force is applied to the center of the beam, whereas a beam freely cantilevered at each end deflects downward in a U-shaped configuration. It is also known that strain-gauge technology is best suited to freely cantilevered beams deflecting in U-shaped configurations. Consequently, the use of the pairs of risers 40 and 41 in the preferred embodiment of the present invention permits the load cell 33 to be safely secured to the bearing plates 36 and 37, yet also permits the load cell 33 to deflect in a U-shaped configuration approximating that of a freely cantilevered beam.

Horizontal slots 42 and 43 extend longitudinally into the load cell 33 from each end. The end of the platform 15 rests upon the upper surface of the load cell 33 and is secured to the load cell by bolts 44 and 45. Thus, weight borne by the platform 15 is transmitted to the upper surface of the load cell 33. The purpose of the slots 42 and 43 is to stabilize the platform 15 and at the same time concentrate the weight distribution onto the center portion of the load cell 33. The portions of the upper surface of the load cell which extend over the slots 42 and 43 provide a broad transverse support for the end of the platform 15 and thereby keep the platform 15 from tipping to one side or the other under the weight of a vehicle wheel displaced to one side of the platform 15. Thus, a broad base of support is provided the platform 15, yet because of the slots 42 and 43 the weight from the platform 15 is nonetheless concentrated near the center of the load cell 33.

On the bottom surface of the load cell 33 are installed strain gauges, not shown. In the preferred embodiment, four strain gauges are emplaced in small slots cut transversely across the bottom surface of the load cell 33. When weight is applied to the platform 15, the load cell 33 deflects and causes electrical output signals from the strain gauges to be transmitted to a scale operator's station, not illustrated, by means of an electrical cable 46. To prevent debris from accumulating underneath the load cell 33 a pair of mud shields 47 and 48 extend upwardly from the support plate 32 along the sides of the load cell 33.

Heater blocks 49 and 50 are secured to the support plate 32 adjacent the bearing plates 36 and 37 and the corresponding support tabs 34 and 35, respectively, of the load cell 33. Heater blocks 49 and 50 are each rectangularly shaped and have longitudinal central bores 51 and 52, respectively. Into the bores 51 and 52 are inserted commercially available electrical resistance heater elements, not shown. The heater elements are cylindrically shaped and are adhesively cemented into the cylindrical bores 51 and 52. In the preferred embodiment, 250 watt or 500 watt heater elements are typically used.

On top of one of the heater blocks, for example heater block 49, is secured a thermostat block 53. The thermostat block 53 is rectangularly shaped and includes a cylindrical central bore 54 much the same as those of heater blocks 49 and 50. Inside the bore 54 is emplaced a commercially available thermostat, not shown. The thermostat is adjustable by means of a screw, not shown, which is accessible from the opening of the bore 54. A hole 55 connects the cylindrical bores 54 and 51 of the thermostat block 53 and heater block 49 and thereby provides an internal route for the wiring between the heater element in block 49 and the thermostat.

To increase thermal conductivity, a layer of thermally conductive material, for example silicone grease, is applied to the facing surfaces between thermostat block 53 and heater block 49, and between the support plate 32 and heater blocks 49 and 50.

Referring in particular to FIGS. 3, 4 and 5, the two electrical heater elements and the thermostat are connected in electrical series by means of insulated conductors routed through conduit boxes 56 and 57 and a length of flexible electrical conduit 58. Electrical power is derived from a standard 120 or 240 volt outlet which may be connected to the circuit by means of an insulated electrical conductor routed into the load cell enclosure 17 through a flexible conduit 59.

During operation, the thermostat opens or closes the electrical circuit whenever its temperature rises or falls outside of a predetermined range of temperatures above 0° Celsius. During warm weather, the thermostat remains at a temperature above the upper limit of the predetermined range of temperatures and the electrical circuit remains open. When the temperature falls, the thermostat closes the electrical circuit and thereby energizes the heater elements. The heater elements in turn warm the heater blocks 49 and 50 and the support plate 32 and prevent ice or snow from accumulating thereon. During continued cold weather, the thermostat cycles on and off and thereby maintains the support plate 32 within a range of temperatures above 0° Celsius.

The load cell 33 is indirectly warmed by thermal conduction from the heater blocks 49 and 50 via the support plate 32 and bearing plates 36 and 37. However, the temperature of the load cell 33 cycles over a much smaller temperature range because the pairs of risers 40 and 41 provide a relatively small path for conductive heat flow from the support plate 32 and bearing plates 36 and 37 to the load cell 33. This bottleneck in the heat flow path effectively dampens the cyclical surge of heat flow to the lod cell 33. Consequently, the temperature of the load cell 33 is maintained at a relatively constant temperature above 0° Celsius, and errors in weight measurement due to expansion and contraction of the load cell 33 are minimized.

Further, in the preferred embodiment of the invention, the load cell 33 and bearing plates 36 and 37 are constructed of a material having a relatively low thermal conductivity, for example steel, whereas the support plate 32 and the heater blocks 49 and 50 are constructed of material having a relatively high thermal conductivity, for example aluminum. In this manner, heat is conducted relatively rapidly from the heater blocks 49 and 50 to the support plate 32, and thereby most efficiently prevents build-up of ice. At the same time, however, cyclical fluctuations in heat conduction to the load cell 33 are dampened even further by the low thermal conductivity of the steel load cell 33 and bearing plates 36 and 37, thereby maintaining the temperature of the load cell 33 at a more constant temperature.

It will be understood that various additions, alterations and modifications to the described and illustrated embodiment may be apparent to one skilled in the art and that the scope of the present invention is defined only by the following claims.

What is claimed is:

1. A vehicle platform scale comprising:
a platform whereupon may be positioned at least one wheel of a vehicle;
at least one load cell, said load cell supporting said platform, said load cell deflecting in response to weight bearing upon said platform, said load cell having at least one strain gauge attached thereto, said load cell being enclosed in a load cell enclosure, said load cell enclosure having side walls and a floor, said load cell being spaced above said floor of said enclosure; and
a heating means for preventing accumulation of ice or snow underneath said load cell, said heating means operating to maintain said floor of said load cell enclosure within a range of temperatures above 0° Celsius.

2. The vehicle platform scale of claim 1 wherein: said heating means further operates to maintain said load cell within a range of temperatures above 0° Celsius.

3. A vehicle platform scale comprising:
a platform whereupon may be positioned at least one wheel of a vehicle;
at least one load cell, said load cell supporting said platform, said load cell deflecting in response to weight bearing upon said platform, said load cell having at least one strain gauge attached thereto, said load cell being enclosed in a load cell enclosure, said load cell enclosure having side walls and a floor, said load cell enclosure further including a support plate on said floor of said load cell enclosure, said load cell being spaced above said support plate of said load cell enclosure; and
a heating means for preventing accumulation of ice or snow underneath said load cell, said heating means being secured to said support plate, said heating means operating to maintain said support plate within a range of temperatures above 0° Celsius.

4. The vehicle platform scale of claim 3 wherein said heating means further operates to maintain said load cell within a range of temperatures above 0° Celsius.

5. A vehicle platform scale comprising:
a platform whereupon may be positioned at least one wheel of a vehicle;
at least one load cell, said load cell supporting said platform, said load cell deflecting in response to weight bearing upon said platform, said load cell having at least one strain gauge attached thereto, said load cell being enclosed in a load cell enclosure having side walls and a floor, said load cell enclosure further including a support plate, said load cell being spaced above said support plate of said load cell enclosure;
a heating means for preventing accumulation of ice or snow underneath said load cell, said heating means comprising at least one heater in conductive contact with said support plate, said heater operating to heat said support plate; and
a thermostat for regulating said heater, said thermostat operating to activate said heater and maintain said support plate within a range of temperatures above 0° Celsius.

6. The vehicle platform scale of claim 5 wherein said heating means comprises a pair of heaters disposed adjacent opposite ends of said load cell, said heaters being fixedly secured in conductive contact with said support plate, said thermostat regulating each of said heaters.

7. A vehicle platform scale as defined in claim 5 wherein said load cell is composed of a material of relatively low thermal conductivity, and said load cell enclosure and said support plate are composed of a material of relatively high thermal conductivity, such that said support plate and said load cell enclosure are maintained within a range of temperatures above 0°

Celsius and said load cell is maintained at a relatively constant temperature above 0° Celsius.

8. A vehicle platform scale comprising:

a pair of load cell enclosures, each of said load cell enclosures having a floor, a pair of side walls, a rear wall, and a partial top plate, said floor of each of said enclosures being substantially rectangular and horizontal, said floor of each of said enclosures having side edges, a forward edge and a rear edge, said side walls extending upwardly from said side edges of said floor, said rear wall extending upwardly from said rear edge of said floor, said side walls and said rear wall terminating in substantially horizontal edges, said partial top plate being substantially horizontal and fixedly attached to said horizontal edges of said rear wall and said side walls, said load cell enclosures being spaced from one another;

a pair of support plates, one support plate being installed in each of said load cell enclosures, said support plates being substantially flat and rectangularly shaped, said support plates being fixedly secured to said floors of said load cell enclosures, said support plates being substantially parallel to one another and to said forward edges of said floors of said load cell enclosures;

two pairs of bearing plates, one pair of bearing plates being fixedly secured to each of said support plates, said pair of bearing plates on each of said support plates being spaced from one another;

a pair of load cells, one load cell supported in each load cell enclosure by said pair of bearing plates, each load cell having support tabs extending from opposite ends thereof, said support tabs being cantilevered off of said bearing plates, each of said load cells having a bottom surface above and spaced from said support plate, each of said load cells having strain gauges installed on said bottom surface;

a platform, said platform being substantially flat and rectangularly shaped, said platform being cantilevered at opposite ends off of said load cells, said platform having an upper surface substantially flush with said partial top plates of said load cell enclosures, said platform having ends abutting edgewise against said partial top plates; and a heating means for maintaining the temperature of said support plates and said load cells above the freezing point of water.

9. The vehicle platform scale as defined in claim 8, wherein said heating means comprises one or more electrical resistance heaters installed in each of said load cell enclosures.

10. The vehicle platform scale as defined in claim 9, wherein said heating means further comprises a thermostat, said thermostat operably connected to said electrical resistance heaters, said thermostat maintaining the temperature of said load cells and support plates within a range of temperatures above freezing.

11. The vehicle platform scale as defined in claim 10, wherein said heating means further comprises:

two pairs of said electrical resistance heaters, one pair of said resistance heaters being fixedly secured to said support plate of each of said load cell enclosures, said electrical resistance heaters on each support plate being secured to said support plate on opposite ends of said load cell and adjacent said bearing plates; and a pair of thermostats, one thermostat installed in each load cell enclosure adjacent one of said electrical resistance heaters, said thermostat being connected in electrical series with said electrical resistance heaters so as to simultaneously regulate each of said electrical resistance heaters, said thermostat maintaining the temperature of said electrical resistance heaters, said support plates and said load cells within a range of temperatures above freezing.

12. The vehicle platform scale as defined in claim 11 wherein said load cells and said bearing plates are composed of a material of relatively low thermal conductivity, and said load cell enclosures and said support plates are composed of a material of relatively high thermal conductivity, whereby said support plates and said load cell enclosures are maintained within a range of temperatures above freezing and said load cells are maintained at a relatively constant temperature above freezing.

* * * * *